(12) United States Patent
Tanaka (10) Patent No.: US 9,381,608 B2
(45) Date of Patent: Jul. 5, 2016

(54) VIBRATION DETERMINATION METHOD AND VIBRATION DETERMINATION DEVICE

(75) Inventor: Takaaki Tanaka, Niwa-Gun (JP)

(73) Assignee: Okuma Corporation, Niwa-Gun (JP)

(*) Notice: Subject to any disclaimer, the term of this patent is extended or adjusted under 35 U.S.C. 154(b) by 685 days.

(21) Appl. No.: 13/353,596

(22) Filed: Jan. 19, 2012

(65) Prior Publication Data

US 2012/0253708 A1 Oct. 4, 2012

(30) Foreign Application Priority Data

Mar. 28, 2011 (JP) ................. 2011-070445

(51) Int. Cl.
*B23Q 11/00* (2006.01)
*B23Q 17/12* (2006.01)
*G05B 19/404* (2006.01)

(52) U.S. Cl.
CPC ............ *B23Q 11/0039* (2013.01); *B23Q 17/12* (2013.01); *G05B 19/404* (2013.01); *G05B 2219/41256* (2013.01)

(58) Field of Classification Search
CPC .............. B23Q 17/0976; B23Q 17/12; G05B 2219/41256; G05B 2219/37434; G05B 2219/37435; G05B 2219/37513; G05B 2219/41115; G05B 2219/34048; G05B 2219/42344; B21B 37/007
See application file for complete search history.

(56) References Cited

U.S. PATENT DOCUMENTS

2008/0289923 A1* 11/2008 Suzuki et al. ................. 188/379
2009/0069927 A1*  3/2009 Suzuki et al. ................. 700/177
2012/0010744 A1*  1/2012 Yamashita et al. ............ 700/173

FOREIGN PATENT DOCUMENTS

JP          2008-290186 A1     12/2008

* cited by examiner

*Primary Examiner* — Gregory J Toatley
*Assistant Examiner* — Kyle R Quigley
(74) *Attorney, Agent, or Firm* — Burr & Brown, PLLC (57) ABSTRACT

When generation of a chatter vibration is detected, a parameter calculation device calculates a first frequency range and a second frequency range. A determination validity is calculated in consideration of a rotation speed detection resolution and a frequency resolution, and based on a ratio of a frequency range of rotational-period forced chatter vibration to a frequency range of regenerative chatter vibration. It is determined based on the determination validity whether the generated chatter vibration is regenerative chatter vibration, rotational-period forced chatter vibration, or flute-passage-period forced chatter vibration.

2 Claims, 6 Drawing Sheets

VIBRATION DETERMINATION METHOD AND VIBRATION DETERMINATION DEVICE

CROSS REFERENCE TO RELATED APPLICATION

This application claims the benefit of Japanese Patent Application Number 2011-070445 filed on Mar. 28, 2011, the entirety of which is incorporated by reference.

FIELD OF THE INVENTION

The present invention relates to a vibration determination method for determining a type of chatter vibration generated in a machine tool during processing performed by rotating a tool or a workpiece, and to a vibration determination device that executes the vibration determination method.

BACKGROUND OF THE INVENTION

A machine tool that performs processing by rotating a rotary shaft may generate a so-called "chatter vibration" during processing when processing conditions such as the depth of cut and the rotation speed of the rotary shaft are inappropriate. Chatter vibration may reduce the finishing accuracy of a processed surface, and may break the tool. Thus, it is desired to suppress chatter vibration.

There are two types of chatter vibration, namely, a "regenerative chatter vibration" which is self-excited vibration generated between the tool and the workpiece, and a "forced chatter vibration" generated by the machine tool itself. Prior to the present application, the applicant proposed a vibration suppressing device that differentiates between the two types of chatter vibration so that respective countermeasures can be taken for the two types of chatter vibration (Japanese Patent Application Publication No. JP 2008-290186 A). In the vibration suppressing device described in JP 2008-290186 A, a time-domain vibration acceleration detected by vibration sensors is subjected to an FFT analysis to calculate a frequency-domain vibration acceleration, and to calculate a chatter frequency $F_C$ at which the frequency-domain vibration acceleration becomes maximum. Then, a k' number, a k number, and a phase difference $\epsilon$ are calculated using formulas (1) to (3) below to determine forced chatter vibration when the phase difference $\epsilon$ is close to zero (e.g., 0.1 or less), that is, the k' number is close to an integer, and to determine regenerative chatter vibration otherwise.

$$k'=60\times F_C/(Z\times S) \quad (1)$$

$$k=\lfloor k' \rfloor \quad (2)$$

$$\epsilon=k'-k \quad (3)$$

In formula (1), Z is the number of tool flutes, and S is the rpm of the rotary shaft. In formula (2), |x'| is a floor function that represents the largest integer that is less than x (that is, formula (2) derives the integer part of the k' number).

Figure 6:
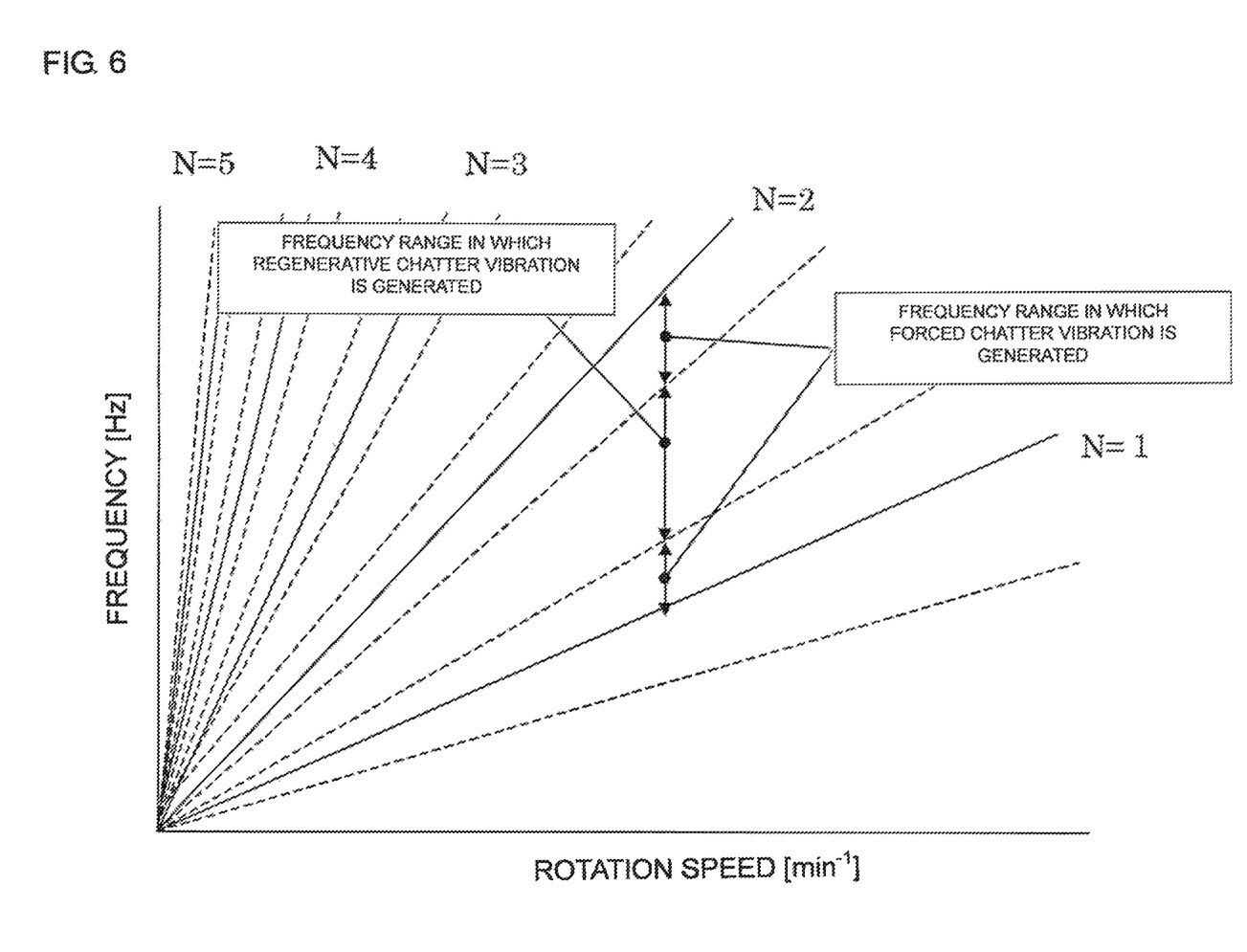
FIG. 6 is a graph that shows the relationship between a rotation speed of a rotary shaft and a chatter frequency of a chatter vibration, and shows ranges for determination according to a vibration determination method of related art.

The vibration suppressing device described in JP 2008-290186 A determines whether the phase difference $\epsilon$ is close to zero based on whether the phase difference $\epsilon$ falls within a range whose upper and lower limits are defined by two constants. That is, as seen in FIG. 6, which shows the relationship between the rotation speed of the rotary shaft and the chatter frequency of the chatter vibration, a technique using the k' number according to the related art determines forced chatter vibration in ranges defined by two dotted lines that are separated by a solid line. Thus, as is clear from FIG. 6, the ranges where forced chatter vibration is determined are proportional to the rotation speed and the chatter frequency, and are wide in regions where both the rotation speed and the chatter frequency are high. Therefore, under such processing conditions, regenerative chatter vibration with a phase difference $\epsilon$ of close to zero may be erroneously determined as forced chatter vibration.

The detection accuracy of vibration acceleration and rotation speed is limited, and inevitably subjected to error. If the rotation speed detection resolution is defined as $\Delta S$ and the frequency resolution in an FFT calculation device is defined as $\Delta f$, a maximum error $\epsilon_{err}$ that may occur in the phase difference $\epsilon$ is calculated using formula (4) below. That is, processing conditions in which at least one of the rotation speed and the chatter frequency is low, for example, have narrow ranges for determination of forced chatter vibration. Under such processing conditions, the phase difference $\epsilon$ may exceed the ranges whose upper and lower limits are defined by two constants because of the error $\epsilon_{err}$. That is, forced chatter vibration may be erroneously determined as regenerative chatter vibration.

Forced chatter vibration is further divided into two types, namely, a "flute-passage-period forced chatter vibration" generated at an integer times the period during which flute portions of the tool pass over a surface of the workpiece, and a "rotational-period forced chatter vibration" generated in the rotational period of the rotary shaft. Flute-passage-period forced chatter vibration can be determined by the vibration suppressing device described in JP 2008-290186 A above. For rotational-period forced chatter vibration, the fundamental frequency is the rotational period, and a phase difference $\epsilon_{sp}$ is calculated using formula (5) below. Thus, chatter vibration with an order of vibration N that is not a multiple of the number of flutes Z does not have a phase difference $\epsilon(\epsilon_{sp})$ of zero, and therefore cannot be detected as forced chatter vibration.

[Expression 1]
Error in phase difference $\epsilon$ $$\epsilon_{err}=((F_C+\Delta f)\times 60)/(Z\times(S-\Delta S))+((F_C-\Delta f)\times 60)/(Z\times(S+\Delta S)) \quad (4)$$

Phase difference in rotational-period forced chatter vibration $$\epsilon_{sp}=Z/N \quad (5)$$

In formula (4), $F_C$ is the chatter frequency, and S is the rpm of the rotary shaft.

SUMMARY OF THE INVENTION

The present invention was devised in view of the foregoing issues, and it is an object of the present invention to provide a vibration determination method and a vibration determination device that can differentiate between a regenerative chatter vibration and a forced chatter vibration more accurately than related art.

In order to achieve the above object, a first aspect of the present invention provides a vibration determination method for detecting whether a chatter vibration is generated in a machine tool that includes a rotary shaft that rotates a tool or a workpiece, and for determining a type of the generated chatter vibration based on vibration information generated when the rotary shaft generates the chatter vibration. The vibration determination method includes a first step of detecting a time-domain vibration of the rotary shaft and a rotation speed of the rotary shaft during rotation, a second step of calculating a chatter frequency and a frequency-domain vibration at the chatter frequency based on the time-domain vibration, and determining that the chatter vibration is generated if the calculated frequency-domain vibration exceeds a predetermined threshold, a third step of calculating a first frequency range and a second frequency range, the first frequency range being calculated by calculating a rotational frequency FCS using formula (6) below, adding and subtracting an offset value OFS to and from a value obtained by multiplying the rotational frequency FCS by an integer, and defining the resulting values as an upper limit and a lower limit of the first frequency range, and the second frequency range being calculated by calculating a flute passage frequency FCF using formula (7) below, adding and subtracting an offset value OFF to and from a value obtained by multiplying the flute passage frequency FCF by an integer, and defining the resulting values as an upper limit and a lower limit of the second frequency range, a fourth step of determining whether the chatter frequency falls within one of the first frequency range and the second frequency range, and determining that the chatter vibration is a regenerative chatter vibration if the chatter vibration does not fall within either of the frequency ranges, a fifth step of, if the chatter frequency falls within one of the first frequency range and the second frequency range, specifying which of the first frequency range and the second frequency range the chatter frequency falls within, and determining that the chatter vibration is a flute-passage-period forced chatter vibration if the chatter frequency falls within the second frequency range, and a sixth step of, if the chatter frequency falls within the first frequency range, calculating a determination validity based on a ratio of the first frequency range to a frequency range for determination as the regenerative chatter vibration, and determining based on the determination validity whether the chatter vibration is a rotational-period forced chatter vibration or the regenerative chatter vibration.

[Expression 2]
Rotational frequency $$FCS = S/60 \quad (6)$$

Flute passage frequency $$FCF = S \times Z/60 \quad (7)$$

In formulas (6) and (7), S is the rpm of the rotary shaft. In formula (7), Z is the number of tool flutes.

According to a second aspect of the present invention, in the vibration determination method of the first aspect, the third step further includes calculating the offset value OFS using formula (8) below and calculating the offset value OFF using formula (9) below.

[Expression 3]
Offset value for frequency range of rotational-period forced chatter vibration $$OFS = \Delta S \times N/60 + \Delta f \quad (8)$$

Offset value for frequency range of flute-passage-period forced chatter vibration $$OFF = \Delta S \times N \times Z/60 + \Delta f \quad (9).$$

In formulas (8) and (9), N is the order of vibration, $\Delta S$ is the rotation speed detection resolution for the rotary shaft, and $\Delta f$ is the frequency resolution for the FFT calculation device.

According to a third aspect of the present invention, in the vibration determination method of the first or second aspect, the sixth step further includes calculating generation frequencies $F_{CN}$ and $F_{CN+1}$ of the rotational-period forced chatter vibration at orders of vibration N and N+1 using formulas (11) and (12) below, calculating offset values $OF_{SN}$ and $OF_{SN+1}$ for the frequency range of the rotational-period forced chatter vibration at the orders of vibration N and N+1 using formulas (13) and (14) below, and calculating a determination validity C using formula (15) below.

[Expression 4]
Generation frequency of rotational-period forced chatter vibration at order of vibration N $$F_{CN} = S/60 \times N \quad (11)$$

Generation frequency of rotational-period forced chatter vibration at order of vibration N+1

$$F_{CN+1} = S/60 \times (N+1) \quad (12)$$

Offset value for frequency range of rotational-period forced chatter vibration at order of vibration N $$OF_{SN} = \Delta S \times N/60 + \Delta f \quad (13)$$

Offset value for frequency range of rotational-period forced chatter vibration at order of vibration N+1

$$OF_{SN+1} = \Delta S \times (N+1)/60 + \Delta f \quad (14)$$

Determination validity for rotational-period forced chatter vibration $$C = (F_{CN+1} - F_{CN}) - (OF_{SN} + S_{N+1})/(F_{CN+1} - F_{CN}) \quad (15)$$

Further, in order to achieve the foregoing object, a fourth aspect of the present invention provides a vibration determination device that determines, in a machine tool that includes a rotary shaft rotating a tool or a workpiece, a type of a chatter vibration generated when the rotary shaft is rotated. The vibration determination device includes a detection unit that detects a time-domain vibration generated by the rotary shaft and a rotation speed of the rotary shaft during rotation, an FFT calculation device that calculates a chatter frequency and a frequency-domain vibration at the chatter frequency based on the time-domain vibration detected by the detection unit, a parameter calculation device that calculates a first frequency range and a second frequency range using the method of the first aspect, a calculation device that, if the frequency-domain vibration exceeds a predetermined threshold, determines that the chatter vibration is generated, and determines the type of the chatter vibration based on the first frequency range and the second frequency range according to the method of the first aspect, and a display device that displays the determined type of the chatter vibration.

According to the present invention, when generation of a chatter vibration is detected, the parameter calculation device calculates the first frequency range and the second frequency range. The determination validity is calculated based on the ratio of the frequency range of rotational-period forced chatter vibration to the frequency range of regenerative chatter vibration. It is determined based on the determination validity whether the generated chatter vibration is regenerative chatter vibration, rotational-period forced chatter vibration, or flute-passage-period forced chatter vibration. According to the second aspect of the present invention, in particular, the rotation speed detection resolution $\Delta S$ and the frequency resolution $\Delta f$ are also taken into consideration. Therefore, it is possible to determine regenerative chatter vibration and forced chatter vibration more accurately than the related art, and to detect rotational-period forced chatter vibration that could not be detected by the related art. Thus, chatter vibration can be more reliably suppressed.

According to the fourth aspect of the present invention, the vibration determination device includes the display device that displays the determined type of the chatter vibration. This allows an operator to easily know the type of chatter vibration generated, and to immediately take effective countermeasures for that particular type of chatter vibration. Thus, the chatter vibration can be suppressed in a short time to minimize a reduction in the finishing accuracy of a processed surface, tool wear, and so forth.

DETAILED DESCRIPTION OF THE INVENTION

A vibration determination method, and a vibration suppressing device that includes a vibration determination device according to an embodiment of the present invention will be described in detail below with reference to the drawings.

Figure 1:
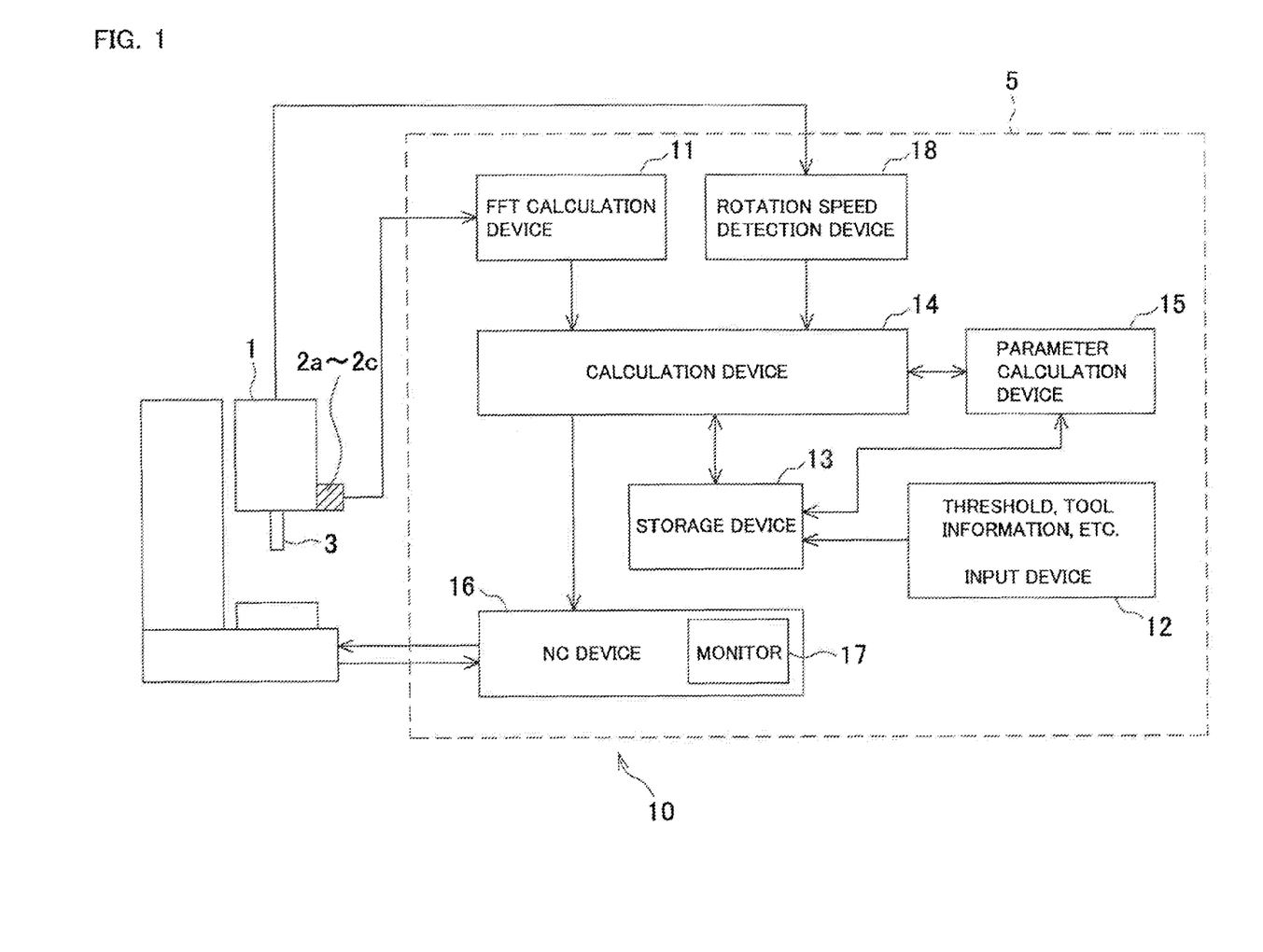
FIG. 1 is a block diagram that shows a vibration suppressing device.
Figure 2:
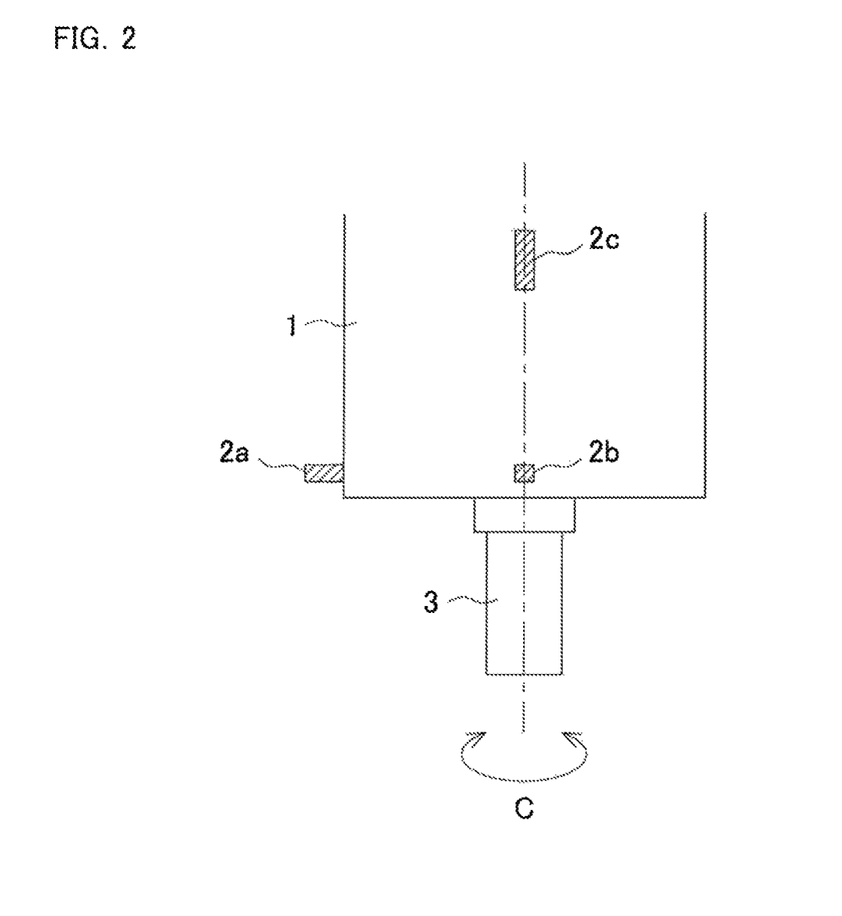
FIG. 2 is a diagram that shows a rotary shaft housing subject to vibration suppression as seen from a side.
Figure 3:
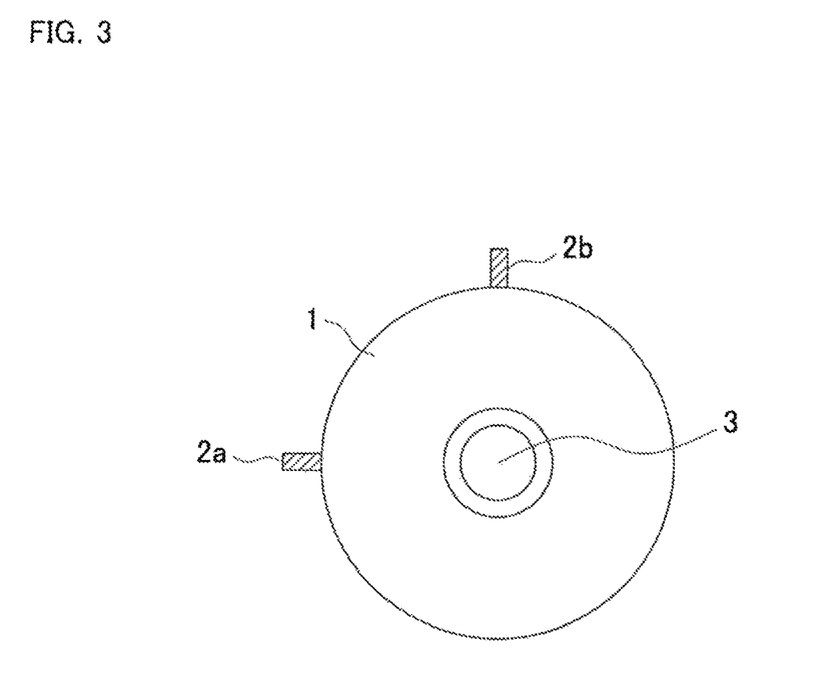
FIG. 3 is a diagram that shows the rotary shaft housing as seen from the axial direction.

FIG. 1 is a block diagram that shows a vibration suppressing device 10. FIG. 2 is a diagram that shows a rotary shaft housing 1 subject to vibration suppression as seen from a side. FIG. 3 is a diagram that shows the rotary shaft housing 1 as seen from the axial direction.

The vibration suppressing device 10 suppresses a "chatter vibration" generated by a rotary shaft 3 provided in the rotary shaft housing 1 as rotatable about an axis C. The vibration suppressing device 10 includes vibration sensors 2a to 2c and a control device 5. The vibration sensors 2a to 2c detect a time-domain vibration acceleration (which means vibration acceleration on a time axis), which is a characteristic value related to the vibration generated by the rotary shaft 3 during rotation. The control device 5 can analyze values detected by the vibration sensors 2a to 2c to determine the presence or absence of chatter vibration and the type of chatter vibration, display the determination results, and change the rotation speed of the rotary shaft 3.

The vibration sensors 2a to 2c are attached to the rotary shaft housing 1 as shown in FIGS. 2 and 3. One vibration sensor is configured to detect the time-domain vibration acceleration in a direction orthogonal to the directions in which the other vibration sensors perform detection (e.g., the vibration sensors 2a to 2c are respectively attached so as to detect time-domain vibration acceleration in the X-axis, Y-axis, and Z-axis directions, which are orthogonal to each other).

The control device 5 includes an FFT calculation device 11, an input device 12, a storage device 13, a calculation device 14, a parameter calculation device 15, an NC device 16, and a rotation speed detection device 18. The FFT calculation device 11 performs an analysis based on the time-domain vibration acceleration detected by the vibration sensors 2a to 2c. The input device 12 is used by an operator to input a threshold for use in determining whether chatter vibration is generated, and to input a value for determination of the type of chatter vibration. The storage device 13 stores the various values input by the operator, the results of calculation performed by the calculation device 14, and so forth. The calculation device 14 determines whether chatter vibration is generated and the type of chatter vibration. The parameter calculation device 15 calculates parameters for determination of the type of chatter vibration. The NC device 16 controls the rotation speed of the rotary shaft 3. The rotation speed detection device 18 detects the rotation speed of the rotary shaft 3. In addition, the NC device 16 includes a monitor 17 that displays an NC program, the current position of the tool, the results of calculation performed by the calculation device 14, and so forth.

Figure 4:
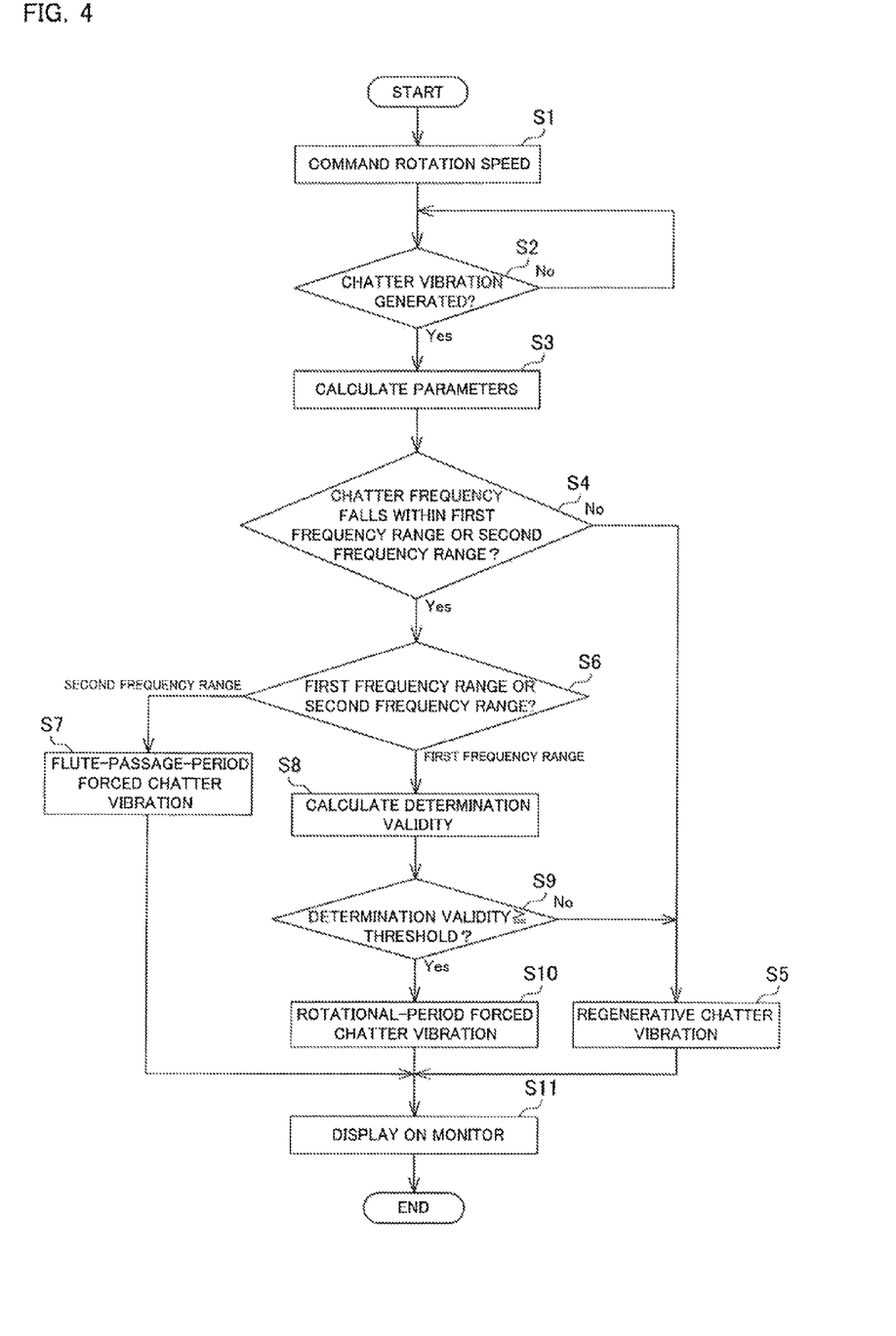
FIG. 4 is a flowchart that shows a vibration determination control.

A vibration determination control, which is an essential portion of the present invention, will be described in detail with reference to the flowchart of FIG. 4.

First, before processing starts, the threshold and the value for determination of the type of chatter vibration discussed above, and tool information such as the number of tool flutes are input using the input device 12 to be stored in advance in the storage device 13. When a command for the rotation speed of the rotary shaft 3 is provided via the NC device 16 to start processing (S1), the control device 5 monitors whether the rotary shaft housing 1 is producing chatter vibration (S2). That is, the vibration sensors 2a to 2c constantly detect the time-domain vibration acceleration of the rotary shaft housing 1, and the FFT calculation device 11 performs a Fourier analysis on the time-domain vibration acceleration to acquire the largest value of a frequency-domain vibration acceleration (maximum acceleration) serving as vibration information and a frequency (chatter frequency) $F_C$. Then, the calculation device 14 compares the acquired maximum acceleration and the threshold stored in the storage device 13. If the maximum acceleration is equal to or less than the threshold, the calculation device 14 determines that chatter vibration is not generated (No at S2).

However, if the maximum acceleration is greater than the threshold, it is determined that the rotary shaft housing 1 is producing chatter vibration that should be suppressed (Yes at S2). The parameter calculation device 15 determines the type of chatter vibration. That is, the parameter calculation device 15 calculates parameters for determination as to whether the chatter vibration is a "regenerative chatter vibration", a "rotational-period forced chatter vibration", or a "flute-passage-period forced chatter vibration" (S3). The parameters include a first frequency range for determination of the possibility of rotational-period forced chatter vibration, and a second frequency range for determination of flute-passage-period forced chatter vibration. The first frequency range is calculated by calculating a rotational frequency FCS using formula (6) below, adding and subtracting an offset value OFS calculated using formula (8) below to and from a value obtained by multiplying the rotational frequency FCS by an integer, and defining the resulting values as the upper limit and the lower limit of the first frequency range. Meanwhile, the second frequency range is calculated by calculating a flute passage frequency FCF using formula (7) below, adding and subtracting an offset value OFF calculated using formula (9) below to and from a value obtained by multiplying the flute passage frequency FCF by an integer, and defining the resulting values as the upper limit and the lower limit of the second frequency range.

[Expression 5]
Rotational frequency $$FCS = S/60 \quad (6)$$

Flute passage frequency $$FCF = S \times Z/60 \quad (7)$$

Offset value for frequency range of rotational-period forced chatter vibration $$OFS = \Delta S \times N/60 + \Delta f \quad (8)$$

Offset value for frequency range of flute-passage-period forced chatter vibration $$OFF = \Delta S \times N \times Z/60 + \Delta f \quad (9)$$

In formulas (6) to (9), S is the rpm of the rotary shaft 3, Z is the number of tool flutes, N is the order of vibration, ΔS is the rotation speed detection resolution, and Δf is the frequency resolution.

When the first frequency range and the second frequency range are calculated by the parameter calculation device 15, the calculation device 14 determines whether the chatter frequency $F_C$ falls within either the first frequency range or the second frequency range (S4). If the chatter frequency $F_C$ does not fall within either the first frequency range and the second frequency range (No at S4), it is determined that the generated chatter vibration is regenerative chatter vibration (S5), and the monitor 17 displays the determination result (S11).

However, if the chatter frequency $F_C$ falls within either the first frequency range or the second frequency range, it is determined which of the frequency ranges the chatter frequency $F_C$ falls within (S6). If the chatter frequency $F_C$ falls within the second frequency range, it is determined that the generated chatter vibration is flute-passage-period forced chatter vibration (S7), and the monitor 17 displays the determination result (S11). However, if the chatter frequency $F_C$ falls within the first frequency range, the order of vibration N of the vibration frequency of rotational-period forced chatter vibration that is less than and closest to the chatter frequency $F_C$ is calculated using formula (10) below. Using the calculated order of vibration N, generation frequencies $F_{CN}$ and $F_{CN-1}$ of rotational-period forced chatter vibration at the orders of vibration N and N+1 are calculated using formulas (11) and (12) below. Offset values $OF_{SN}$ and $OF_{SN+1}$ for the frequency range of rotational-period forced chatter vibration at the orders of vibration N and N+1 are calculated using formulas (13) and (14) below. Further, a determination validity C for determination as to whether the chatter vibration is rotational-period forced chatter vibration or regenerative chatter vibration is calculated using formula (15) below (S8). That is, the determination validity C is calculated based on the ratio of the frequency range of rotational-period forced chatter vibration to the frequency range of regenerative chatter vibration.

[Expression 6]
Order of vibration of generation frequency of rotational-period forced chatter vibration that is less than and closest to frequency $F_C$ of generated vibration $$N = |F_C \times 60/S| \quad (10)$$

Generation frequency of rotational-period forced chatter vibration at order of vibration N $$F_{CN} = S/60 \times N \quad (11)$$

Generation frequency of rotational-period forced chatter vibration at order of vibration N+1

$$F_{CN-1} = S/60 \times (N+1) \quad (12)$$

Offset value for frequency range of rotational-period forced chatter vibration at order of vibration N $$OF_{SN} = \Delta S \times N/60 + \Delta f \quad (13)$$

Offset value for frequency range of rotational-period forced chatter vibration at order of vibration N+1

$$OF_{SN+1} = \Delta S \times (N+1)/60 + \Delta f \quad (14)$$

Determination validity for rotational-period forced chatter vibration $$C = (F_{CN+1} - F_{CN}) - (OF_{SN} + OF_{SN+1})/(F_{CN+1} - F_{CN}) \quad (15)$$

Then, a comparison is made between the determination validity C calculated at S8 and a validity threshold stored in advance in the storage device 13 (S9). If the determination validity C is equal to or greater than the validity threshold (Yes at S9), it is determined that the generated chatter vibration is rotational-period forced chatter vibration (S10). However, if the determination validity C is less than the validity threshold (No at S9), it is determined that the generated chatter vibration is regenerative chatter vibration (S5). In both cases, the monitor 17 displays the determination result (S11).

Then, the operator determines the type of chatter vibration generated based on the results displayed on the monitor 17, and changes the rotation speed of the rotary shaft 3 in accordance with the type of chatter vibration generated to suppress the chatter vibration.

Figure 5:
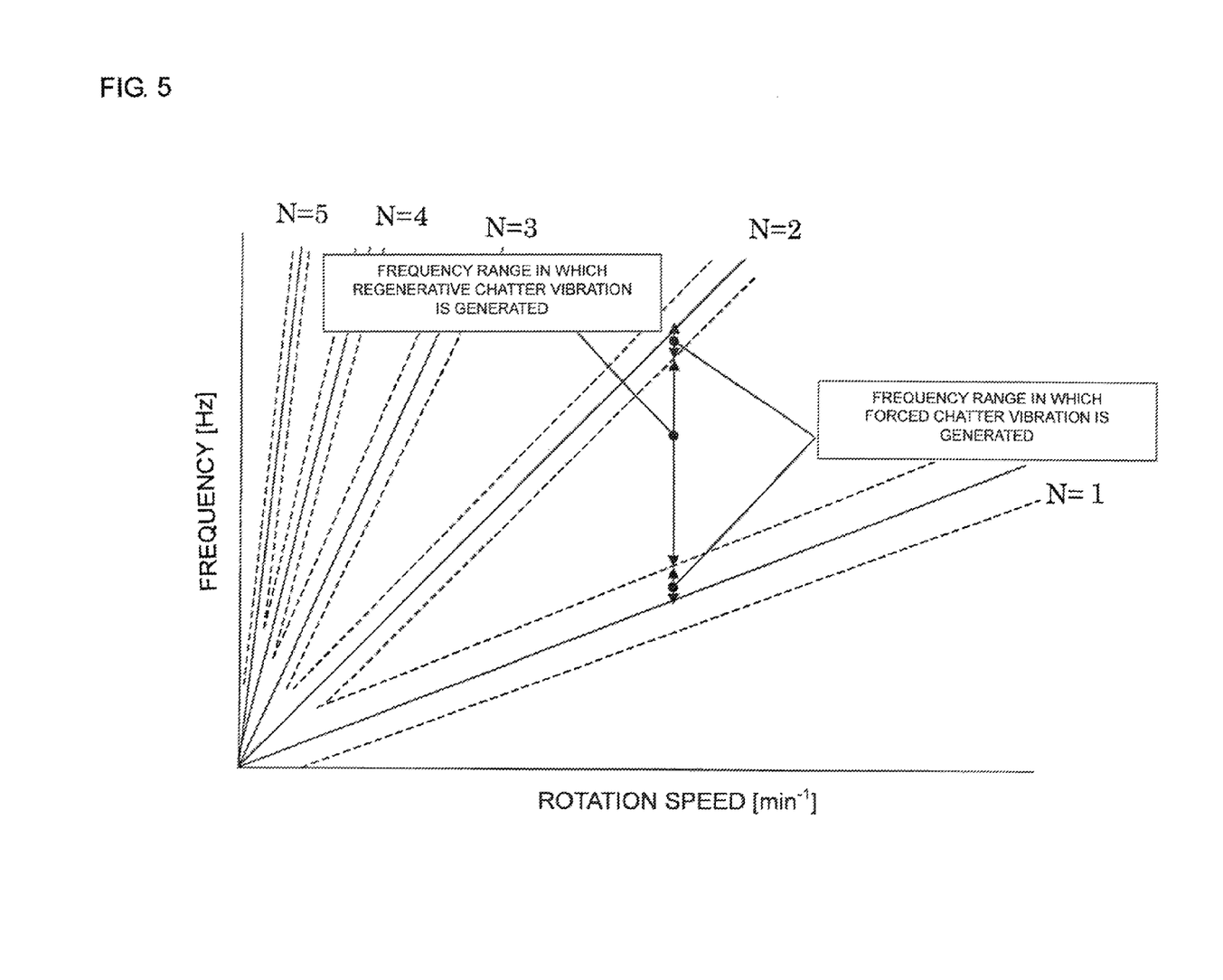
FIG. 5 is a graph that shows the relationship between a rotation speed of a rotary shaft and a chatter frequency of a chatter vibration, and shows ranges for determination according to a vibration determination method of the present invention.

According to the vibration suppressing device 10 configured as described above, when the generation of chatter vibration is detected, the parameter calculation device 15 calculates the first frequency range and the second frequency range, and the determination validity C is calculated in consideration of the rotation speed detection resolution ΔS and the frequency resolution Δf and based on the ratio of the frequency range of rotational-period forced chatter vibration to the frequency range of regenerative chatter vibration. It is determined based on the determination validity C whether the generated chatter vibration is regenerative chatter vibration, rotational-period forced chatter vibration, or flute-passage-period forced chatter vibration. That is, as seen in FIG. 5, which shows the relationship between the rotation speed of the rotary shaft and the chatter frequency of chatter vibration, the determination method according to the present embodiment determines ranges indicated by dotted lines as ranges for the determination of forced chatter vibration. Unlike the determination method that uses the k' number according to the related art, the ranges for the determination of forced chatter vibration are not widened in proportion to the rotation speed and the chatter frequency. The ranges are set in consideration of the various detection errors and the determination validity C as described above. Therefore, it is possible to determine regenerative chatter vibration and forced chatter vibration more accurately than the related art, and to detect rotational-period forced chatter vibration that could not be detected by the related art. Thus, chatter vibration can be more reliably suppressed.

The determined type of chatter vibration is displayed on the monitor 17. This allows the operator to easily know the type of chatter vibration generated, and to immediately take effective countermeasures for that particular type of chatter vibration. Thus, the chatter vibration can be suppressed in a short time to minimize a reduction in the finishing accuracy of a processed surface, tool wear, and so forth.

The vibration determination device according to the present invention is not limited in any way to the embodiment described above. Modifications may be made as appropriate without departing from the scope and spirit of the present invention in the configuration of the detection unit, the control for determination of the type of chatter vibration, the control performed after the determination, and so forth.

For example, in the embodiment described above, the vibration sensors are used to detect the vibration acceleration of the rotary shaft. However, a displacement of the rotary shaft or a sound pressure due to vibration may be detected to calculate a stable rotation speed based on the detected displacement or sound pressure. Alternatively, a detector that detects the position or rotation of the rotary shaft or a current measurement instrument that measures a current for a rotary shaft motor or a feed spindle motor may be used as the detection unit.

In the vibration suppressing device, a calculation formula (e.g., a calculation formula described in JP 2008-290186 A) corresponding to the determined type of chatter vibration may be used to calculate a stable rotation speed at which the chatter vibration can be suppressed so that the NC device automatically changes the rotation speed of the rotary shaft to the stable rotation speed.

Further, when detecting chatter vibration, a plurality of (e.g., three) waveforms indicating the largest values of frequency-domain vibration acceleration may be used, rather than using only a waveform indicating the largest value of frequency-domain vibration acceleration, to improve the detection accuracy of chatter vibration.

In the embodiment described above, the vibration of a rotary shaft of a machine tool is detected. However, the vibration of a non-rotary member (fixed member) may be detected so as to detect the presence or absence of chatter vibration. Furthermore, the present invention is not limited to application to a machining center that rotates a tool, the present invention may also be applied to a machine tool such as a lathe that rotates a workpiece. It shall be understood that the installation position and number of vibration sensors, the thresholds to be compared with another threshold or the determination validity, and so forth may be modified as appropriate in accordance with the type, size, and so forth of the machine tool.

What is claimed is:
1. A method for improving a finishing accuracy of surfaces of a workpiece processed using a machine tool that includes a rotary shaft that rotates, the method comprising:
   starting machine processing of a surface of the workpiece;
   a first step of detecting a time-domain vibration of the rotary shaft and a rotation speed of the rotary shaft during rotation;
   a second step of calculating a chatter frequency $F_C$ and a frequency-domain vibration at the chatter frequency based on the time-domain vibration, and determining that the chatter vibration is generated if the calculated frequency-domain vibration exceeds a predetermined threshold;
   a third step of calculating a first frequency range and a second frequency range, the first frequency range being calculated by calculating a rotational frequency FCS using formula (6), adding and subtracting an offset value OFS to and from a value obtained by multiplying the rotational frequency FCS by an integer value of N, and defining the resulting values as an upper limit and a lower limit of the first frequency range, and the second frequency range being calculated by calculating a flute passage frequency FCF using formula (7), adding and subtracting an offset value OFF to and from a value obtained by multiplying the flute passage frequency FCF by the integer value of N, and defining the resulting values as an upper limit and a lower limit of the second frequency range;
   a fourth step of determining whether the chatter frequency falls within one of the first frequency range and the second frequency range, determining that the chatter vibration is a regenerative chatter vibration if the chatter vibration does not fall within either of the frequency ranges and displaying to an operator that the determined type of chatter vibration is a regenerative chatter vibration;
   a fifth step of, if the chatter frequency falls within one of the first frequency range and the second frequency range, specifying which of the first frequency range and the second frequency range the chatter frequency falls within, determining that the chatter vibration is a flute-passage-period forced chatter vibration if the chatter frequency falls within the second frequency range and displaying to the operator that the determined type of chatter vibration is a flute-passage-period forced chatter vibration;
   a sixth step of, if the chatter frequency falls within the first frequency range, calculating a determination validity C for a rotational-period forced chatter vibration, determining based on the calculated determination validity C whether the chatter vibration is one of a rotational-period forced chatter vibration and the regenerative chatter vibration, and displaying to the operator that the determined type of chatter vibration is one of the rotational-period forced chatter vibration and the regenerative chatter vibration; and
   changing operating parameters of the machine tool based on the determined type of generated vibration displayed to the operator to suppress the determined type of generated vibration and minimize a reduction of finishing accuracy on the surface being processed by the machine tool, wherein

$$FCS = S/60 \quad (6),$$

and $$FCF = S \times Z/60 \quad (7)$$

where:
   S is an RPM of the rotary shaft, and
   Z is a number of tool flutes,
wherein
the third step further includes calculating the offset value OFS using formula (8) and calculating the offset value OFF using formula (9), wherein $$OFS = \Delta S \times N/60 + \Delta f \quad (8),$$

$$OFF = \Delta S \times N \times Z/60 + \Delta f \quad (9)$$

and $$N = [F_C \times 60]/S \quad (10),$$

where
   $\Delta S$ is a rotation speed detection resolution;
   N is an integer value of N which is a maximum value not exceeding a value resulting from the above equation, which represents an order of vibration of a vibration frequency of rotational-period forced chatter vibration,
   S is the RPM of the rotary shaft,
   Z is the number of tool flutes, and Δf is a frequency resolution of FFT calculation device, and wherein the sixth step further includes calculating generation frequencies $F_{CN}$ and $F_{CN+1}$ of the rotational-period forced chatter vibration at orders of vibration N and N+1 using formulas (11) and (12), calculating offset values $OF_{SN}$ and $OF_{SN+1}$ for the frequency range of the rotational-period forced chatter vibration at the orders of vibration N and N+1 using formulas (13) and (14), calculating the determination validity C using formula (15), and comparing the calculated determination validity C to a stored validity threshold value, wherein if the calculated determination validity C is greater or equal to the stored validity threshold value, determining and displaying that the vibration is a rotational-period forced chatter vibration, and if the calculated determination validity C is less than the stored validity threshold value, determining and displaying that the vibration is a regenerative chatter vibration, wherein $$N = [F_C \times 60]/S \quad (10),$$

$$F_{CN} = S/60 \times N \quad (11),$$

$$F_{CN+1} = S/60 \times (N+1) \quad (12),$$

$$OF_{SN} = \Delta S \times N/60 + \Delta f \quad (13),$$

$$OF_{SN+1} = \Delta S \times (N+1)/60 + \Delta f \quad (14),$$

and $$C = (F_{CN+1} - F_{CN}) - (OF_{Sn} + OF_{SN+1})/(F_{CN+1} - F_{CN}) \quad (15)$$

where:
S is the RPM of the rotary shaft,
N is an integer value of N which is a maximum value not exceeding a value resulting from the above equation, which represents the order of vibration of a vibration frequency of rotational-period forced chatter vibration,
ΔS is a rotation speed detection resolution, and
Δf is a frequency resolution of FFT calculation device.

2. The method according to claim 1, wherein the sixth step further includes calculating generation frequencies $F_{CN}$ and $F_{CN+1}$ of the rotational-period forced chatter vibration at orders of vibration N and N+1 using formulas (11) and (12), calculating offset values $OF_{SN}$ and $OF_{SN+1}$ for the frequency range of the rotational-period forced chatter vibration at the orders of vibration N and N+1 using formulas (13) and (14), calculating the determination validity C using formula (15), and comparing the calculated determination validity C to a stored validity threshold value, wherein if the calculated determination validity C is greater or equal to the stored validity threshold value, determining and displaying that the vibration is a rotational-period forced chatter vibration, and if the calculated determination validity C is less than the stored validity threshold value, determining and displaying that the vibration is a regenerative chatter vibration, wherein $$F_{CN} = S/60 \times N \quad (11),$$

$$F_{CN+1} = S/60 \times (N+1) \quad (12),$$

$$OF_{SN} = \Delta S \times N/60 + \Delta f \quad (13),$$

$$OF_{SN+1} = \Delta S \times (N+1)/60 + \Delta f \quad (14),$$

and $$C = (F_{CN+1} - F_{CN}) - (OF_{SN} + OF_{SN+1})/(F_{CN+1} - F_{CN}) \quad (15)$$

where:
S is the RPM of the rotary shaft,
N is an integer value of N which is a maximum value not exceeding a value resulting from the above equation, which represents the order of vibration of the vibration frequency of rotational-period forced chatter vibration,
ΔS is the rotation speed detection resolution, and
Δf is the frequency resolution of FFT calculation device.

\* \* \* \* \*